(12) United States Patent
Gu et al.

(10) Patent No.: US 8,577,495 B2
(45) Date of Patent: Nov. 5, 2013

(54) AUTOMATIC CALIBRATION AND COMPENSATION FOR A CNC MACHINE TABLE AND AN ASSOCIATED PROBE

(75) Inventors: Jie Gu, Clarkston, MI (US); John S. Agapiou, Rochester Hills, MI (US); Sheri K. Kurgin, Macomb, MI (US); Paula J. Deeds, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 418 days.

(21) Appl. No.: 12/951,287

(22) Filed: Nov. 22, 2010

(65) Prior Publication Data

US 2012/0130531 A1 May 24, 2012

(51) Int. Cl.
*G06F 19/00* (2011.01)
(52) U.S. Cl.
USPC .......... 700/195; 700/174; 700/186; 700/182; 700/193

(58) Field of Classification Search
USPC ................ 700/60, 174, 186, 182, 193, 195
See application file for complete search history.

(56) References Cited

U.S. PATENT DOCUMENTS

| | | | | |
|---|---|---|---|---|
| 4,819,339 A | * | 4/1989 | Kunzmann et al. | 33/503 |
| 7,905,027 B2 | * | 3/2011 | MacManus | 33/502 |
| 2001/0045021 A1 | * | 11/2001 | Matsuda et al. | 33/502 |

* cited by examiner

*Primary Examiner* — Sean Shechtman
(74) *Attorney, Agent, or Firm* — Quinn Law Group, PLLC

(57) ABSTRACT

A method for calibrating a CNC machine comprises mounting a gauge to a table of the CNC machine and calibrating a probe to the gauge mounted on the CNC machine. A total deviation of the probe and an actual table center position from a nominal table center position for a coordinate system associated with the CNC machine are determined. A controller operatively connected to the CNC machine and the probe is programmed to compensate for the total deviation.

14 Claims, 5 Drawing Sheets

AUTOMATIC CALIBRATION AND COMPENSATION FOR A CNC MACHINE TABLE AND AN ASSOCIATED PROBE

TECHNICAL FIELD

The present invention relates generally to calibration of CNC machines, specifically to calibration of a machine table and probe.

BACKGROUND

Computer numerically controlled (CNC) machines are frequently used to manufacture items that require machining processes to be used. A coordinate system is used to program the CNC machine for the machining process and the center of the coordinate system is associated with a center point for a table of the CNC machine.

In order to maximize CNC machining productivity, fixtures may be employed to align each part with the machine table. A fixture allows parts with different locating and clamping arrangements to be machined at the same machine table center. When the fixture is installed on the table, it is possible that it will not be perfectly aligned, e.g., due to debris or other locating errors.

To prevent the installation errors from compromising machined part quality, the exact location of the fixture may be electronically probed, and the results can be included in the machine's work offset. However, to obtain accurate probe results, the probe must first be calibrated. Several methods of calibrating probes are currently used. However, each method requires the effort of skilled maintenance personnel to perform precise calculations and complex procedures. Therefore, probe calibration using these methods requires several hours of machine downtime.

SUMMARY

A method for calibrating a CNC machine comprises mounting a gauge to a table for the CNC machine and calibrating a probe to the gauge mounted on the table. A total deviation of the probe and an actual table center position from a nominal table center position for a coordinate system associated with the CNC machine is determined. A controller operatively connected to the CNC machine and the probe is programmed to compensate for the total deviation.

A method for calibrating a probe to a gauge mounted on the CNC machine comprises measuring a plurality of points about a circumference of the gauge with the probe, and calculating a center point of the gauge utilizing the plurality of measurements taken by the probe.

A method of calibrating the probe and CNC machine table center to the coordinate system for the CNC machine comprises measuring a first actual gauge position on the coordinate system for the CNC machine with the probe. The table for the CNC machine is rotated and the actual gauge position on the coordinate system at a second actual gauge position is measured. The total deviation of the probe and the actual machine table center to a nominal machine table center is calculated using the first and the second actual gauge positions. A controller operatively connected to the CNC machine and the probe is programmed to compensate for the total deviation.

The above features and advantages, and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
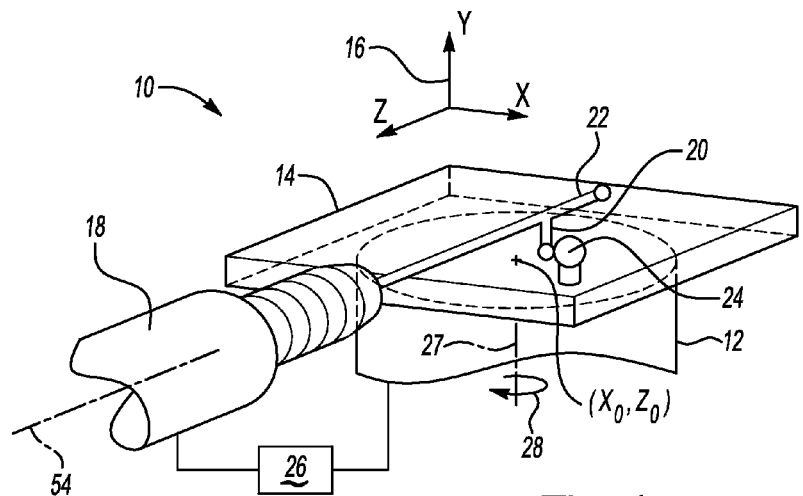
FIG. 1 is a partial schematic perspective view of a portion of a CNC machine having a probe located on a table for the CNC machine in a first position.
Figure 2:
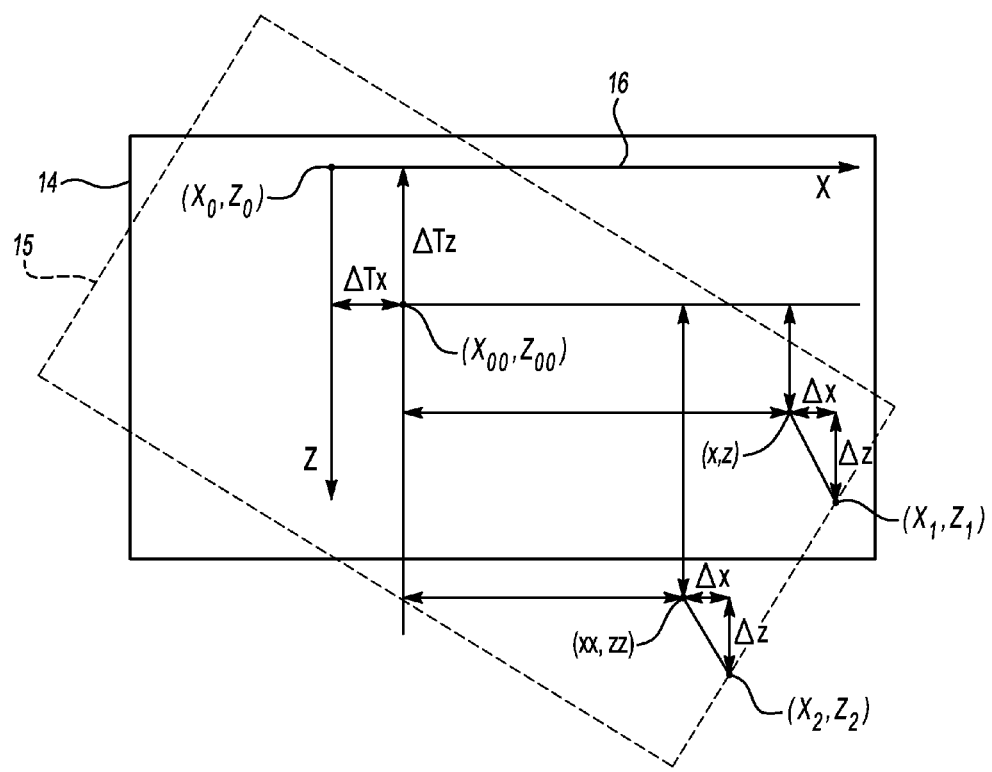
FIG. 2 is a schematic top view illustration of a base fixture and coordinate system for the CNC machine of FIG. 1.

Referring to the drawings, wherein like reference numbers refer to the same or similar components throughout the several views, FIG. 1 illustrates a partial view of a portion of a four-axis B rotary table CNC machine 10. The CNC machine 10 has a table 12. A base fixture 14 is mounted to the table 12 and a coordinate system 16 is associated with the table 12 and base fixture 14. FIG. 2 schematically illustrates a top view of the base fixture 14 with the coordinate system 16 represented thereon.

Referring to FIGS. 1 and 2, a probe 18 is operatively connected to the CNC machine 10. The probe 18 has a lateral stylus 22 and a straight stylus 20 for measuring point locations associated with the CNC machine 10. The probe 18 may be rotated about a spindle axis 54, such that the lateral stylus 22 and the straight stylus 20 may be located at a number of rotational positions, as described in further detail below. A sphere gauge 24 is mounted to the base fixture 14 for calibrating the table 12 and the probe 18. The probe 18 is able to obtain measurements from various locations about the circumference of the sphere gauge 24.

The probe 18 and the table 12 are operatively connected to a controller 26 to provide input from the probe 18 and the table 12. The controller 26 also controls the CNC machine 10 including the rotational position of the table 12. In the embodiment shown, the CNC machine 10 rotates about the B-axis (shown at 27). The rotation of the CNC machine 10 is represented by arrow 28.

The coordinate system 16 is centered at a nominal table position ($X_0$, $Z_0$) which is the center position as recorded by the controller 26 for the CNC machine 10. The actual table center ($X_{00}$, $Z_{00}$) deviates a distance ($\Delta Tx$, $\Delta Tz$) away from the nominal table center ($X_0$, $Z_0$). In addition to the table deviation ($\Delta Tx$, $\Delta Tz$) between the actual table center ($X_{00}$, $Z_{00}$) and nominal table center ($X_0$, $Z_0$), the probe 18 is not calibrated. Therefore, any measurements taken by the probe 18 will deviate from the actually measured position by a distance of ($\Delta x$, $\Delta z$).

The sphere gauge 24 is located on the table at a first location (x, z). The first location (x, z) can be anywhere on the coordinate system 16 and the sphere gauge 24 does not need to be placed to the table 12 and base fixture 14 in a specific location. When the table 12 and the probe 18 are not calibrated, any measurements taken will include the deviation ($\Delta Tx$, $\Delta Tz$) from the nominal table center ($X_0$, $Z_0$) to the actual table center ($X_{00}$, $Z_{00}$), as well as the deviation ($\Delta x$, $\Delta z$) of the probe 18, specifically of the lateral stylus 22 which is illustrated as measuring the sphere gauge 24. In addition to the table deviation ($\Delta x$, $\Delta z$) of the probe 18 measurements, the calibration for the probe 18 may also account for flexing of the lateral stylus 22 and/or the straight stylus 20, whichever is used to take measurements.

Figure 3:
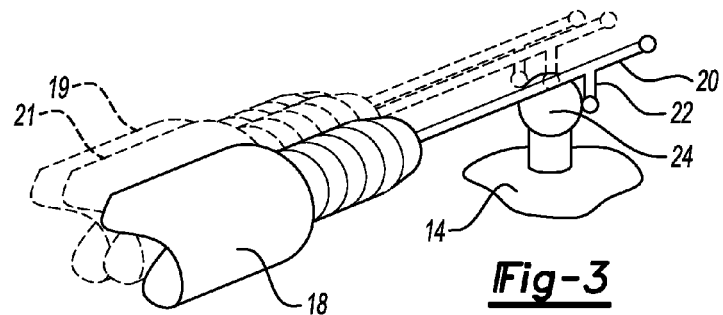
FIG. 3 is a partial schematic perspective view of a portion of the CNC machine illustrating a first embodiment of centering the probe for use with the CNC machine of FIG. 1.
Figure 4:
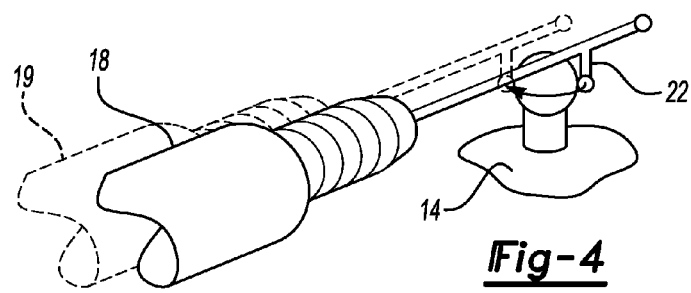
FIG. 4 is a partial schematic perspective view of a portion of a CNC machine illustrating a first embodiment of calibrating a lateral stylus for the probe for use with the CNC machine of FIG. 1.

Referring to FIGS. 3-4, the probe 18 is calibrated to the sphere gauge 24. The probe 18 first measures multiple locations around the sphere gauge 24 using the lateral stylus 22. For example, the lateral stylus 22 measures four locations about the circumference of the sphere gauge 24. FIG. 3 illustrates the probe 18 taking a measurement at a first location on the circumference of the sphere gauge 24. Additional measurements are taken about the circumference as represented by the probe at 19 and 21, shown in phantom (only two of the multiple locations about the sphere gauge 24 are shown). Using these circumference measurements a least square fit calculation is performed to determine the center location of the sphere gauge 24 which is located at position (x, z) in FIG. 2. Thus, the center of the sphere gauge 24 has been determined and the lateral stylus 22 of the probe 18 is now calibrated to the sphere gauge 24.

As mentioned above, in some instances is may be desirable to also determine a flexing or push/pull deviation of the lateral stylus 22 as well. If this is desired, the probe 18 then measures two opposing points on the circumference of the sphere gauge 24, as illustrated in FIG. 4. The first measured location is shown by probe 18 and the second measured location is shown in phantom by probe 19. The two opposing points are compared with the expected measurement points to the center of the sphere gauge 24 as determined above. The average difference between the actual and expected measurements is a result of any push/pull deviation of the probe 18. The push/pull deviation of the probe 18 is deviation that occurs due to flexing of the lateral stylus 22 of the probe 18 as a result of push or pull on the probe 18. The first flexing deviation of the probe 18 is calculated by averaging the measurements.

The lateral stylus 22 deviation ($\Delta x$, $\Delta z$) of the probe 18 and the nominal to actual table center deviation ($\Delta Tx$, $\Delta Tz$) are collinear to one another. Therefore, the total deviation ($\Delta Tx + \Delta x$, $\Delta Tz + \Delta z$) of the table 12 and the lateral stylus 22 of the probe 18 must still be calibrated.

Figure 5:
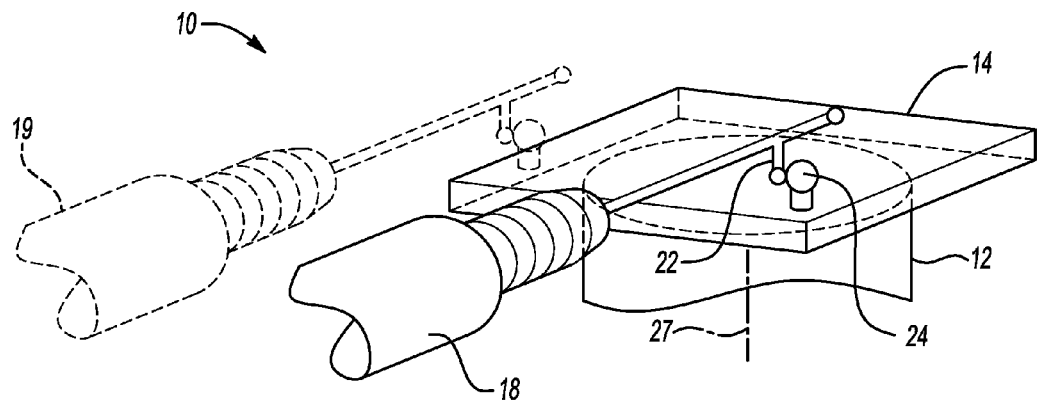
FIG. 5 is a partial schematic perspective view of a portion of a CNC machine illustrating a first embodiment of calibrating a table center for the CNC machine of FIG. 1.

Referring to FIGS. 1, 2 and 5 the lateral stylus 22 measures the first location (x, z) of the sphere gauge 24. Due to the probe 18 not being calibrated to the table 12 and the difference between the nominal table center ($X_0$, $Z_0$) and the actual table center ($X_{00}$, $Z_{00}$) the first measured sphere gauge 24 position is actually ($X_1$, $Z_1$). Where the first measured x-location ($X_1$) is equal to the actual x-position (x) of the sphere gauge 24 plus the x-deviation of the table center ($\Delta Tx$), plus the lateral stylus 22 x-deviation ($\Delta x$) of the probe 18. Likewise, the first measured z-location ($Z_1$) is equal to the actual z-position (z) of the sphere gauge 24, plus the z-deviation of the table center ($\Delta Tz$), plus the probe 18 z-deviation ($\Delta z$). The first sphere gauge position ($X_1$, $Z_1$) is measured at a first rotational position $B_1$ about the table axis 27 (illustrated in FIG. 5). This is represented by the equations below:

$$X_1 = x + \Delta Tx + \Delta x; \text{ and}$$

$$Z_1 = z + \Delta Tz + \Delta z.$$

The table 14 may than be rotated about the B-axis 27 such that the sphere gauge 24 is at a second position $B_2$. In the embodiment shown, the second table 12 rotational position is B-degrees from the original table 12 rotational position. As the table 12 and the base fixture 14 are rotated, the coordinate system 16 does not rotate. The second table position $B_2$ of the base fixture 14 is illustrated in FIG. 2 in phantom at 15. The sphere gauge 24 rotates about the actual table center ($X_{00}$, $Z_{00}$) not the nominal table center ($X_0$, $Z_0$). Therefore, after the table 12 and base fixture 14 have rotated the sphere gauge 24 is now located at a point (xx, zz) with reference to the original coordinate system 16, at the second table position $B_2$. The difference B in the rotational position of the table is $B = B_2 - B_1$.

The measurements may be taken where the first rotational position $B_1$ is 0-degrees of rotation about the B-axis 27 and the second rotational position $B_2$ is 90-degrees of rotation about the B-axis 27. However, the probe 18 may not be able reach the sphere gauge 24 when in the 0-degrees rotational position about the B-axis 27. Therefore, any two rotational positions $B_1$, $B_2$ of the sphere gauge 24 may be used. The should be around 90-degrees apart, such that the calculated total deviation ($\Delta Tx + \Delta x$, $\Delta Tz + \Delta z$) will have similar accuracy distribution for both the x and z-directions. Additionally, the below total deviation ($\Delta Tx + \Delta x$, $\Delta Tz + \Delta z$) equations are directed toward using only two rotational positions $B_1$, $B_2$ of the sphere gauge 24. However, the total deviation ($\Delta Tx + \Delta x$, $\Delta Tz + \Delta z$) equations described below may be adjusted to utilize measurements taken at more than two sphere gauge 24 positions. One skilled in the art would be able to modify the equations to calculate total deviation ($\Delta Tx + \Delta x$, $\Delta Tz + \Delta z$) using more than two measured locations.

An actual second sphere position (xx, zz) is measured by the probe 18, specifically by the lateral stylus 22 (illustrated in FIG. 5 in phantom at 19). As before, the measured second sphere location ($X_2$, $Z_2$) includes the deviation ($\Delta x$, $\Delta z$) of the probe 18. Thus, the position of the sphere gauge 24 is known for two positions of the table 18. Having two known positions for the sphere gauge 24 we can then solve for the total deviation ($\Delta Tx+\Delta x$, $\Delta Tz+\Delta z$) between the known positions and the nominal table center ($X_0$, $Z_0$). This is represented by the equations below, where $B=B_2-B_1$:

$$\Delta Tx + \Delta x = \frac{(X_1+X_2)[1-\cos(B_1-B_2)]+(-Z_1+Z_2)\sin(B_1-B_2)}{2[1-\cos(B_1-B_2)]};$$

and $$\Delta Tz + \Delta z = \frac{(X_1-X_2)(\sin B_1 - \sin B_2)+(Z_1+Z_2)[1-\cos(B_1-B_2)]}{2[1-\cos(B_1-B_2)]}.$$

Thus, the total deviation ($\Delta Tx+\Delta x$, $\Delta Tz+\Delta z$) of the table 12 and the probe 18, specifically the lateral stylus 22 is known. The total deviation ($\Delta Tx+\Delta x$, $\Delta Tz+\Delta z$) may then be entered into the controller 26 for the CNC machine 10 and the nominal work coordinate center 16 can be offset to compensate for the total deviation ($\Delta Tx+\Delta x$, $\Delta Tz+\Delta z$). Thus, the table 12 center is found and the probe 18 is calibrated in a single procedure.

Figure 6:
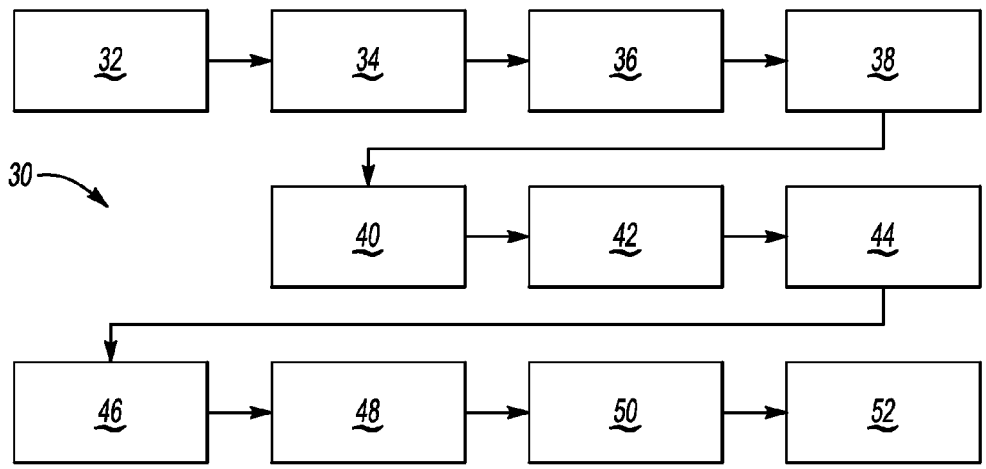
FIG. 6 is a schematic flow chart illustration of a first method of calibrating the probe and the CNC machine of FIG. 1.
Figure 9:
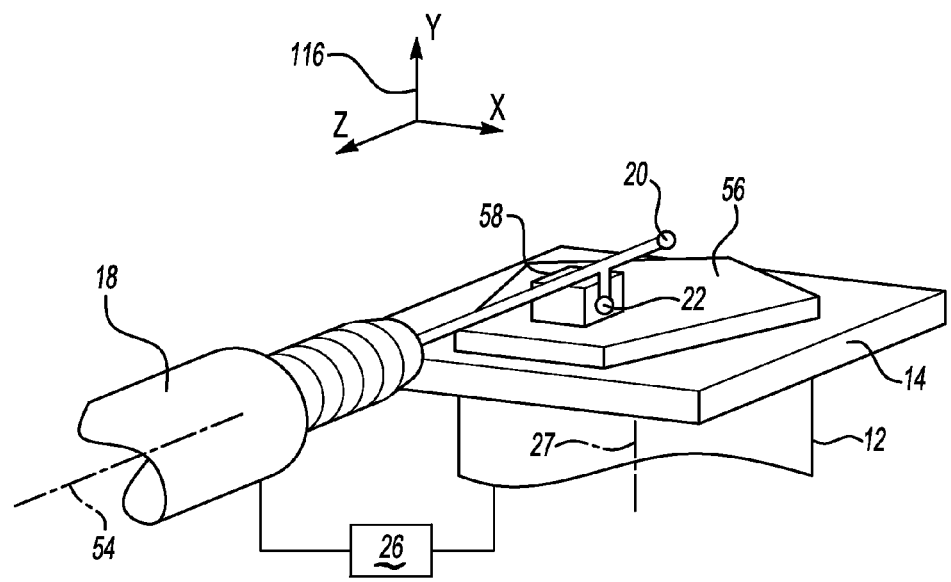
FIG. 9 is a partial schematic perspective view of a portion of the CNC machine of FIG. 1 illustrating a first embodiment of measuring a x-location with the calibrated and compensated probe and machine table center.
Figure 10:
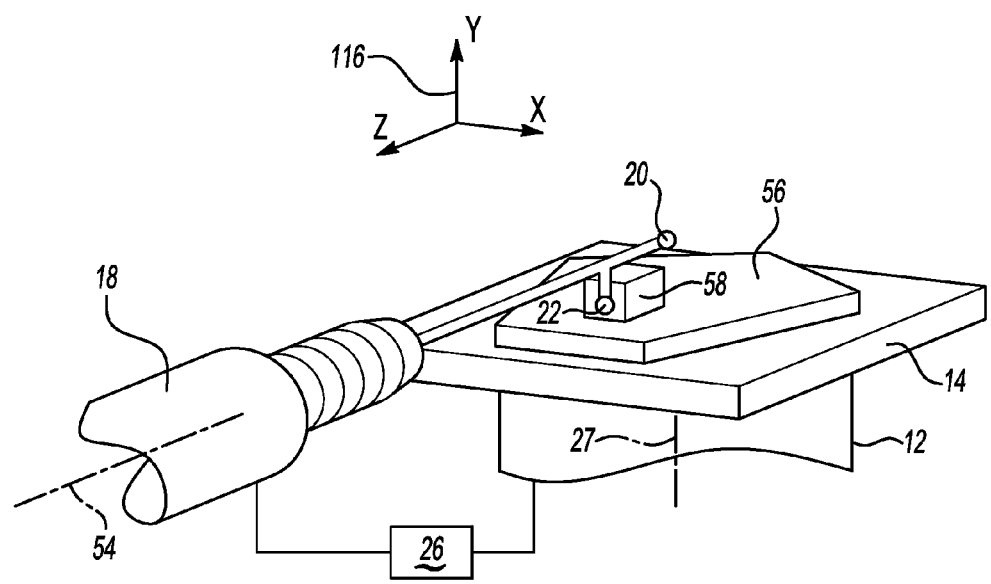
FIG. 10 is a partial schematic perspective view of a portion of the CNC machine of FIGS. 1 and 9 illustrating a first embodiment of measuring a z-location with the calibrated and compensated probe and machine table center.
Figure 11:
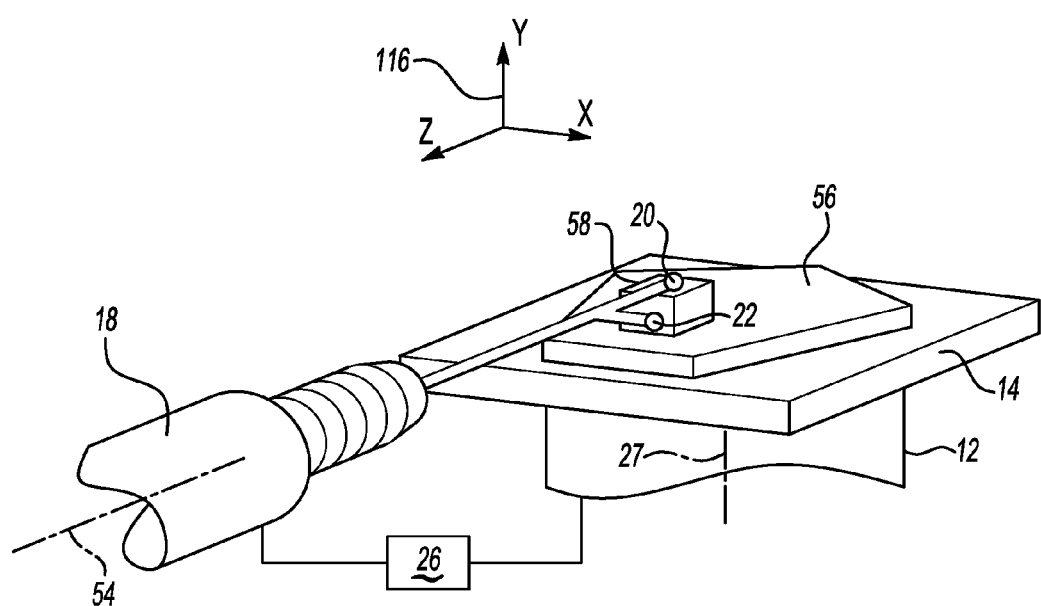
FIG. 11 is a partial schematic perspective view of a portion of the CNC machine of FIGS. 1 and 9-10 illustrating a first embodiment of measuring a y-location with the calibrated and compensated probe and machine table center.

Referring to FIGS. 1 and 6, a method 30 for automatically calibrating the sum of errors for the probe 18, specifically the lateral stylus 22 and the table 12 center is described. A coordinate system 16 is input into the controller 26 to establish a nominal table center, step 32. A gauge 24 is placed on the table 12, step 34. The lateral stylus 22 is moved to a first sphere gauge 24 location, step 36. The lateral stylus 22 takes multiple measurements about the circumference of the sphere gauge 24 to center the probe 18 to the sphere gauge 24 and determine a first measured sphere location ($X_1$, $Z_1$), step 38. Using the multiple measurements, a least square fit calculation is used to find the center of the sphere gauge 24, step 40. If desired, the probe 18 than calibrates the first flexing deviation, i.e. the push/pull, of the probe 18, step 42. Whether of not a first flexing deviation of the probe 18 is calibrated, the table is rotated about the B-axis 27 to move the sphere gauge 24 to a second location, step 44. The lateral stylus 22 takes multiple measurements about the circumference of the sphere gauge 24 to determine a second measured sphere location ($X_2$, $Z_2$), step 46. Using the least square fit calculations again the center of the sphere gauge 24 is calculated for the second sphere location ($X_2$, $Z_2$), step 48. The CNC machine 10 then uses the first and second measurements to calculate the total deviation ($\Delta Tx+\Delta x$, $\Delta Tz+\Delta z$) of the table 12 center and the probe 18, step 50. The co-ordinate system 16 for the CNC machine 10 is re-centered to compensate for the total deviation for future measurements and controls, step 52 The re-centered coordinate system 116 is illustrated in FIGS. 9-11.

Thus, the CNC table 12 and the probe 18, specifically the lateral stylus 22 are calibrated and the total deviation ($\Delta Tx+\Delta x$, $\Delta Tz+\Delta z$) is compensated for by the controller 26. Thereafter, the XZ directions of a feature 58 on a fixture 56 (shown in FIGS. 9-11) mounted on the CNC machine 10 can actually be probed by the compensated lateral stylus 22. Additionally, the straight stylus 20 can be calibrated in the Y-direction by probing the top of the sphere gauge 24 at two spindle positions, as described below with reference to FIGS. 7 and 8.

The calibration method 30 may be automated by the controller 26 such that the entire calibration process for the CNC table 12 center and probe 18 will take a few minutes for the CNC machine 10.

Figure 7:
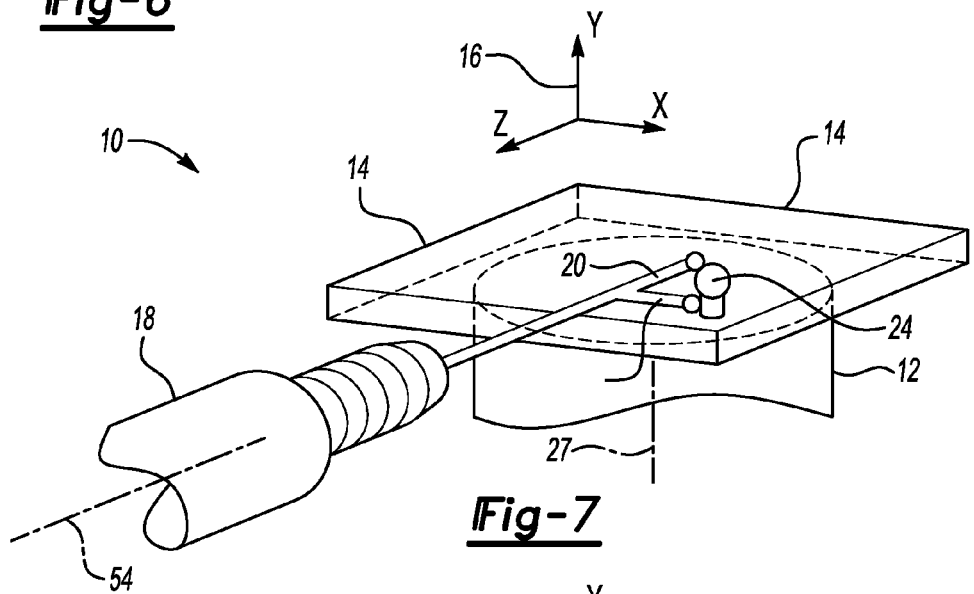
FIG. 7 is a partial schematic perspective view of a portion of a CNC machine illustrating a first embodiment of calibrating a straight stylus for the probe for use with the CNC machine of FIG. 1.
Figure 8:
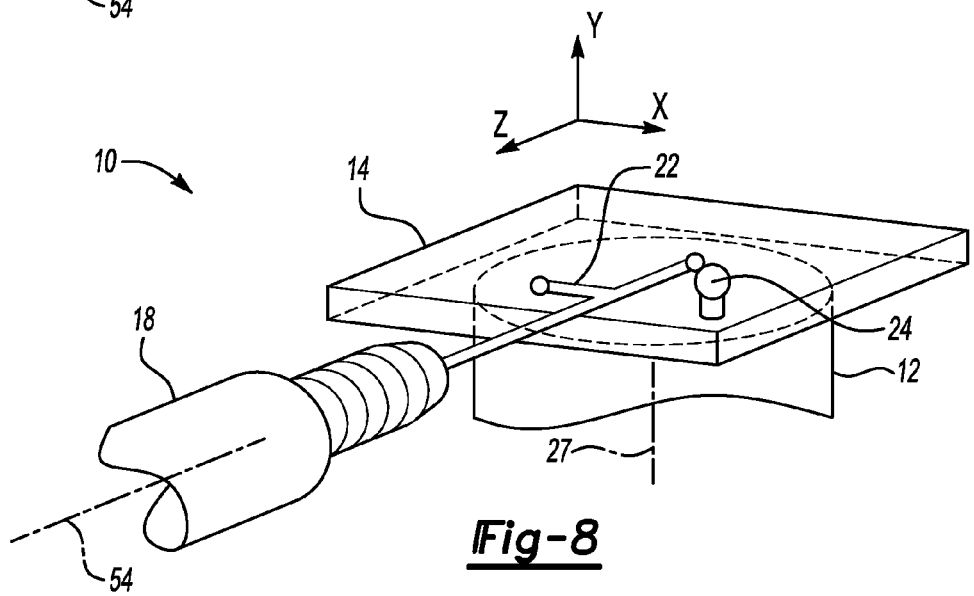
FIG. 8 is a partial schematic perspective view of a portion of a CNC machine further illustrating the first embodiment of calibrating the straight stylus for the probe for use with the CNC machine of FIGS. 1 and 7.

FIGS. 7 and 8 illustrate a method for calibrating the straight stylus 20 in the y-direction for the probe 18, or for taking measurements with an un-calibrated straight stylus 20. In the embodiments described above, the lateral stylus 22 was used for taking measurements of the sphere gauge 24 and was calibrated as illustrated in FIGS. 4 and 6. However, the straight stylus 20 for the probe 18 has not been calibrated. The straight stylus 20 must be calibrated to account for flex in the straight stylus 20 when the probe is taking measurements. Thus, a second flexing deviation must be determined to account for flexing of the straight stylus 20. Alternately, the method described below may simply be repeated every time a measurement is taken with the straight stylus 20.

The straight stylus 20 may be calibrated for the CNC machine 10 by taking a first measurement of the top of the sphere gauge 24 in the y-direction position with the straight stylus 20 when the probe 18 is located at a 90 degree orientation. The 90 degree orientation refers to the probe 18 rotating about a spindle axis 54. Zero degrees of rotation for the probe 18 refers to the position of the lateral stylus 22 as extending downward toward the CNC table 12. In FIG. 7 the lateral stylus 22 is rotated counter-clockwise about the spindle axis 54 by 90 degrees and the first measurement of the sphere gauge 24 is taken with the straight stylus 20. The result of the first straight stylus 20 measurement is input into the controller 26. The probe 18 may then be rotated to the 270 degree orientation and a second measurement is taken and input into the controller 26. The first and second measurements are averaged to find the actual y-position of the sphere top and therefore calibrate the second flexing deviation for the straight stylus 20 of the probe 18. With known actual y-position and the certified sphere diameter, the straight stylus 20 is calibrated in y-direction by a conventional calibration procedure.

The above embodiment for calibrating the CNC machine 10 table center and probe 18 may be used for CNC machines 10 that have horizontally or vertically mounted fixtures to find the calibrated X and Z positions. Further, although a sphere gauge 24 is used, a ring gauge may also be used. One skilled in the art would be able to determine if a ring gauge or a sphere gauge should be used for a particular calibration process and CNC machine 10. After the probe 18 and table center 12 have been calibrated a flexible fixture 56 (shown in FIGS. 9-11) may be mounted to the base fixture 14. The flexible fixture 56 may then be measured by the CNC machine 10 using the previously calibrated probe 18.

FIGS. 9-11 illustrate using the calibrated probe 18 to measure a locating feature 58 located on a flexible fixture 56 for the CNC machine 10. The co-ordinate system 116 has been re-centered using the method described above. The flexible fixture 56 is mounted on the base fixture 14. The flexible fixture 56 includes a plurality of locating features 58 (only one shown). FIG. 9 illustrates how the probe 18 may be positioned to measure a x-location of the locating feature 58 using the lateral stylus 22, which has been calibrated as described above. FIG. 10 illustrates how the probe 18 may be positioned to measure a z-location of the locating feature 58 using the lateral stylus 22. FIG. 11 illustrates how the probe 18 may be positioned to measure a y-location of the locating feature 58 using the straight stylus 20 which has been calibrated as described above in FIG. 7-8. Alternately, if the straight stylus 20 has not been calibrated prior to mounting the flexible fixture 56 on the base fixture 14 the y-location of the locating feature 58 may still be measured by the straight stylus 20. As described above, a measurement is taken with the straight stylus 20 when the probe 18 is located at each of two rotational orientations 180-degrees apart on the spindle axis 54 (as illustrated in FIGS. 7-8). The measurements are averaged to determine the y-location of the locating feature 58.

While the best modes for carrying out the invention have been described in detail, those familiar with the art to which this invention relates will recognize various alternative designs and embodiments for practicing the invention within the scope of the appended claims.

The invention claimed is:

1. A method for calibrating a CNC machine comprising:
   mounting a spherical gauge to a table of the CNC machine;
   measuring a first plurality of points about a circumference of the spherical gauge with a probe;
   calculating a first center point of the spherical gauge utilizing the first plurality of points measured by the probe;
   rotating the table;
   measuring a second plurality of points about the circumference of the spherical gauge with the probe;
   calculating a second center point of the spherical gauge utilizing the second plurality of points measured by the probe, the second center point being rotated about an actual table center from the first center point;
   determining the coordinates of the actual table center from the first center point and the second center point;
   determining a total deviation of the probe and the actual table center from a nominal table center position within a coordinate system associated with the CNC machine; and
   programming a controller operatively connected to the CNC machine and the probe to compensate for the total deviation.

2. The method of claim 1, further comprising:
   measuring two opposing points on the circumference of the gauge with the probe, wherein each of the opposing points is measured with a respective opposing side of the probe; and
   calculating a first flexing deviation of the probe based upon the two opposing points measured to calibrate the probe with the gauge.

3. The method of claim 1, wherein calibrating the probe further comprises:
   measuring a y-location of a feature with a straight stylus of the probe when a lateral stylus of the probe is positioned at a first orientation about a spindle axis;
   measuring the y-location of the feature with the straight stylus of the probe when the lateral stylus of the probe is positioned at a second orientation about a spindle axis that is 180 degrees from the first orientation; and
   calculating an actual y-location of the feature by averaging the first and second measurements.

4. The method of claim 1, wherein determining the total deviation of the probe and the actual table center further comprises:
   calculating the offset in the total deviation of the probe and the actual machine table center using the first actual gauge position and the second actual gauge position; and
   programming the controller for the CNC machine with the calculated total deviation to calibrate the probe and machine table center for future calculations.

5. The method of claim 1, wherein calibrating a probe to the gauge mounted on the table includes taking measurements of the gauge with a lateral stylus of the probe.

6. The method of claim 1, wherein the spherical gauge is a single spherical gauge.

7. The method of claim 1, wherein the rotation of the table is approximately 90 degrees about the actual table center.

8. A method of calibrating a probe and CNC machine table center to a coordinate system for a CNC machine comprising:
   measuring a first actual gauge position of a gauge disposed on the machine table on the coordinate system for the CNC machine with the probe;
   rotating the machine table for the CNC machine and measuring a second actual gauge position of the gauge disposed on the machine table;
   calculating the offset in the total deviation of the probe and the actual machine table center to a nominal machine table center using the first and the second actual gauge positions; and
   programming a controller for the CNC machine with the calculated total deviation to calibrate the probe and machine table center to the coordinate system for the CNC machine.

9. The method of claim 8, wherein programming the controller further comprises re-centering the coordinate system with the table based upon the total deviation calculated.

10. The method of claim 8, wherein the probe is calibrated to the gauge mounted on the CNC machine prior to calibrating the probe to the CNC machine, and where calibrating the probe to the gauge comprises:
    measuring a plurality of points about a circumference of the gauge with the probe; and
    calculating a center point of the gauge utilizing the plurality of points measured by the probe.

11. The method of claim 10, further comprising:
    measuring two opposing points on the circumference of the gauge with the probe, wherein each of the opposing points is measured with a respective opposing side of the probe; and
    calculating a first flexing deviation of the probe based upon the two opposing points measured to calibrate the probe with the gauge mounted to the CNC machine.

12. The method of claim 10, further comprising:
    measuring a y-location of a feature with a straight stylus of the probe when a lateral stylus of the probe is positioned at a first orientation about a spindle axis;
    measuring the y-location of the feature with the straight stylus of the probe when the lateral stylus of the probe is positioned at a second orientation about a spindle axis that is 180 degrees from the first orientation; and
    calculating an actual y-location of the feature by averaging the first and second measurements.

13. The method of claim 10, wherein calculating the center point of the gauge comprises using a least square fit calculation.

14. The method of claim 8, wherein the gauge is a sphere gauge.

* * * * *